(12) United States Patent
Shaotran et al.

(10) Patent No.: US 12,112,466 B2
(45) Date of Patent: Oct. 8, 2024

(54) SYSTEMS AND METHODS FOR AUTOMATED ELECTRICAL PANEL ANALYSIS

(71) Applicant: BP PULSE FLEET NORTH AMERICA INC., Mountain View, CA (US)

(72) Inventors: Ethan Shaotran, Palo Alto, CA (US); Bryan M. Chow, Santa Clara, CA (US)

(73) Assignee: BP PULSE FLEET NORTH AMERICA INC., Mountain View, CA (US)

( * ) Notice: Subject to any disclaimer, the term of this patent is extended or adjusted under 35 U.S.C. 154(b) by 448 days.

(21) Appl. No.: 17/470,255

(22) Filed: Sep. 9, 2021

(65) Prior Publication Data
US 2023/0005126 A1 Jan. 5, 2023

Related U.S. Application Data

(60) Provisional application No. 63/218,197, filed on Jul. 2, 2021.

(51) Int. Cl.
*G06T 7/00* (2017.01)
*B60L 53/62* (2019.01)
(Continued)

(52) U.S. Cl.
CPC ............ *G06T 7/0004* (2013.01); *B60L 53/62* (2019.02); *G06N 3/08* (2013.01); *G06Q 30/018* (2013.01);
(Continued)

(58) Field of Classification Search
CPC ......... G06T 7/0004; G06T 2207/20081; G06T 2207/20084; B60L 53/62; G06V 20/00; G06N 3/08; G06Q 30/018; G06Q 50/26
See application file for complete search history.

(56) References Cited

U.S. PATENT DOCUMENTS

| 9,766,277 | B2 * | 9/2017 | Patel | G01R 35/00 |
| 2011/0126165 | A1 * | 5/2011 | Stebnicki | G06F 30/18 |
| | | | | 716/122 |
| 2016/0188763 | A1 * | 6/2016 | Beiner | H01H 9/167 |
| | | | | 703/18 |

(Continued)

FOREIGN PATENT DOCUMENTS

| KR | 200421155 Y1 * | 7/2006 |
| KR | 102295188 B1 * | 8/2021 |

OTHER PUBLICATIONS

Hoffmann et al. Integration of Novel Sensors and Machine Learning for Predictive Maintenance in Medium Voltage Switchgear to Enable the Energy and Mobility Revolutions. Sensors. 2020; 20(7):2099. https://doi.org/10.*

(Continued)

*Primary Examiner* — Vu Le
*Assistant Examiner* — Jack Peter Kraynak
(74) *Attorney, Agent, or Firm* — Dorsey & Whitney LLP

(57) ABSTRACT

A method of determining a capability of an electrical panel includes providing information relative to the electrical panel to a computer vision software, such as through an image captured by a camera. An attribute of the electrical panel may be analyzed, using the computer vision software, panel at least partially based on the information. An overall electrical power capacity of the electrical panel may be calculated based at least in part on the attribute of the electrical panel. An electrical load on the electrical panel may be calculated based at least in part on the attribute of the electrical panel. A report may be generated that includes an unused electrical power capacity of the electrical panel at least partially based on the electrical load and the overall electrical power capacity of the electrical panel.

20 Claims, 10 Drawing Sheets

(51) Int. Cl.
*G06N 3/08* (2023.01)
*G06Q 30/018* (2023.01)
*G06Q 50/26* (2024.01)
*G06V 20/00* (2022.01)

(52) U.S. Cl.
CPC ............. *G06V 20/00* (2022.01); *G06Q 50/26* (2013.01); *G06T 2207/20081* (2013.01); *G06T 2207/20084* (2013.01)

(56) References Cited

U.S. PATENT DOCUMENTS

| | | |
|---|---|---|
| 2020/0394784 A1 | 12/2020 | Toth et al. |
| 2021/0073692 A1 | 3/2021 | Saha et al. |
| 2022/0058591 A1 | 2/2022 | Xiong et al. |

OTHER PUBLICATIONS

Mohd Shawal Jadin et al., Feature extraction and classification for detecting the thermal faults in electrical installations, Measurement, 2014, vol. 57, pp. 15-24, ISSN 0263-2241, https://doi.org/10.1016/j.measurement.2014.07.010.*

Mileta Žarković et al., Artificial intelligence SF6 circuit breaker health assessment, 2019, Electric Power Systems Research, vol. 175, 105912, ISSN 0378-7796, https://doi.org/10.1016/j.epsr.2019.105912.*

International Search Report and Written Opinion for PCT Application No. PCT/US2022/035572 dated Oct. 21, 2022.

* cited by examiner

SYSTEMS AND METHODS FOR AUTOMATED ELECTRICAL PANEL ANALYSIS

CROSS-REFERENCE TO RELATED APPLICATIONS

This application claims priority to U.S. Provisional Patent Application No. 63/218,197, filed Jul. 2, 2021, entitled "SYSTEMS AND METHODS FOR AUTOMATED ELECTRICAL PANEL ANALYSIS," which is incorporated by reference herein, in the entirety and for all purposes.

FIELD

The described examples relate generally to systems and techniques for analyzing an electrical panel.

BACKGROUND

An electrical panel may operate to divide and distribute a main electrical input to various secondary circuits. Each secondary circuit may be associated with a circuit breaker and/or switch that electrically couples the secondary circuit to the main electrical input, and may also serve as an overcurrent protector (or other failsafe). The electrical panel may be capable of supporting numerous secondary circuits based on a variety of factors including panel loading. In-service electrical panels come in a variety of configurations, including having a number of secondary circuits that may be less than the maximum number of secondary circuits that the particular in-service panel is capable of supporting. As such, in-service electrical panels may be capable of supporting the electrical load and associated mechanical components for additional secondary circuits, such as a secondary circuit associated with an electric vehicle charging station. However, facility-specific electrical characteristics, such as existing loads, cable sizes, and service capacities may hinder the ability to determine whether another secondary circuit can be added and/or whether the load requirements of the circuit, such as that for an electrical vehicle charging station (or other use), are compatible with the existing infrastructure. There is a constant need for systems and techniques for analysis of electric panels.

SUMMARY

Examples of the present invention are directed to systems and methods for analyzing an electrical panel.

In one example, a method of determining a capability of an electrical panel is disclosed. The method includes providing information relative to the electrical panel to a computer vision software. The method further incudes analyzing, using the computer vision software, an attribute of the electrical panel at least partially based on the information. The method further includes calculating an overall electrical power capacity of the electrical panel based at least in part on the attribute of the electrical panel. The method further includes calculating an electrical load on the electrical panel based at least in part on the attribute of the electrical panel. The method further includes generating a report comprising an unused electrical power capacity of the electrical panel at least partially based on the electrical load and the overall electrical power capacity of the electrical panel. The information provided to the computer vision software includes a digital image of the electrical panel. The digital image depicts a plurality of circuit breakers. Each circuit breaker of the plurality of circuit breakers has one or more symbols identifiable by the computing device.

In another example, analyzing the attribute of the electrical panel can comprise identifying characteristics of each electrical breaker electrically coupled to the electrical panel based on the one or more symbols. The characteristics of the electrical breaker can comprise at least one of a voltage rating, an amperage rating, a single pole configuration, a double pole configuration, and a tandem breaker configuration. In some cases, analyzing the attribute of the electrical panel at least partially based on the information includes at least one of: (i) identifying, using the computer vision software, operational characteristics of each circuit breaker based at least in part on the one or more symbols corresponding to each circuit breaker; and/or (ii) identifying, using the computer vision software, an amount of vacant breaker slots on the electrical panel; and/or (iii) identifying, using the computer vision software, a make, model, and/or type (e.g., residential, commercial, industrial) of the electrical panel; and/or (iv) identifying a geographic location at which the digital image was taken.

In another example, calculating the electrical load on the electrical panel may include estimating an average electrical power provided by the electrical panel to loads connected to the electrical panel. In some cases, calculating the overall electrical power capacity of the electrical panel is at least partially based on the operational characteristics of each circuit breaker and a number of vacant electrical breaker slots within the electrical panel.

In another example, calculating the unused electrical power capacity may include comparing the electrical load on the electrical panel to the overall electrical power capacity of the electrical panel. In some cases, estimating the average electrical power provided by the electrical panel is at least partially based on historical electrical power provided to the electrical panel. Further, the power capacity of the panel may be determined or influenced based on: (i) the rating of the panel itself based on the construction, the material, or design; (ii) the rating of the main breaker, typically sized based on the main service wires coming into the panel; and/or (iii) the main service wires coming in (e.g., the service capacity). In each of these cases, these are directly related to assessing whether an electrical service/panel upgrade is necessary in order to support additional loads, such as additional loads associated with electrical vehicle charging stations.

In another example, the method may further include transmitting, automatically, the report to at least one of: an owner of the electrical panel, an energy management provider, a municipality, or a supplier of electric vehicle charging equipment.

In another example, the method may further include requesting supplementary information associated with the electrical panel, such as requesting information from a utility, an owner of the panel, a municipality, and so on in order to supplement the electrical panel analysis, as described herein.

In another example, the method may further include training the computer vision software to identify a type of an electrical panel or a type of an electrical breaker.

In another example, a computing device for determining a capability of an electrical panel is disclosed. The computing device includes a processor. The computing device further includes a memory in electronic communication with the processor. The memory stores computer executable instructions that, when executed by the processor, cause the processor to perform the step of providing a digital image of the electrical panel to an image recognition module. The memory stores further computer executable instructions that, when executed by the processor, cause the processor to perform the step of identifying, using the digital image recognition module, an amperage rating of each electrical breaker of a plurality of electrical breakers disposed within the electrical panel. The memory stores further computer executable instructions that, when executed by the processor, cause the processor to perform the step of calculating an electrical capacity of the electrical panel based at least in part on the amperage rating of each electrical breaker. The memory stores computer executable instructions that, when executed by the processor, cause the processor to perform the step of generating a report comprising the capability of the electrical panel at least partially based on the electrical capacity of the electrical panel.

In another example, calculating the electrical capacity of the electrical panel may include weighting the amperage rating of each electrical breaker to determine a weighted amperage rating for each electrical breaker. Calculating the electrical capacity of the electrical panel may further include estimating an average power provided by each electrical breaker. Calculating the electrical capacity of the electrical panel may further include summing the average power provided by each electrical breaker to estimate a total average power provided by the electrical panel. Calculating the electrical capacity of the electrical panel may further include comparing the total average power to a maximum power output value of the electrical panel. The maximum power output value being at least partially based on one or more vacant electrical breaker slots within the electrical panel.

In another example, the memory may store further computer executable instructions that, when executed by the processor, cause the processor to perform the step of comparing the estimated total average power to historical power usage data of the electrical panel. The memory may store further computer executable instructions that, when executed by the processor, cause the processor to perform the step of identifying, using the image recognition module, a date the electrical panel was manufactured. The memory may store further computer executable instructions that, when executed by the processor, cause the processor to perform the step of identifying, using the image recognition module, a manufacturer of the electrical panel. The memory may store further computer executable instructions that, when executed by the processor, cause the processor to perform the step of identifying, using the image recognition module, a model of the electrical panel. The memory may store further computer executable instructions that, when executed by the processor, cause the processor to perform the step of identifying a construction date of a building to which the electrical panel provides power. The memory may store further computer executable instructions that, when executed by the processor, cause the processor to perform the step of identifying a type of building in which the electrical panel is disposed.

In another example, the report includes at least one of: (i) information relating to building code compliance or non-compliance; and/or (ii) information relating to modifications to the electrical panel required to support an electric vehicle charging circuit; and/or (iii) information relating to a type or quantity of electric vehicle charging circuits that can be supported by the electrical panel.

In another example, the digital image depicts the plurality of electrical breakers. Each electrical breaker of the plurality of electrical breakers may have one or more symbols identifiable by the image recognition software. In some cases, the processor is configured to rotate a portion of the digital image depicting the electrical breaker prior to identifying the one or more symbols.

In another example, a non-transitory computer-readable storage medium storing computer executable instructions is disclosed that, when executed by a processor, cause the processor to perform the step of providing information relative to an electrical panel to an image recognition software. The computer executable instructions further cause the processor to perform the step of analyzing, using the image recognition software, an attribute of the electrical panel at least partially based on the information. The computer executable instructions further cause the processor to perform the step of calculating an electrical power capacity of the electrical panel based at least in part on the attribute of the electrical panel. The computer executable instructions further cause the processor to perform the step of generating a report comprising the capability of the electrical panel at least partially based on the electrical capacity of the electrical panel. The information provided relative to the electrical panel includes a digital image of the electrical panel. The digital image depicts a plurality of circuit breakers. Each circuit breaker of the plurality of circuit breakers has one or more symbols identifiable by the image recognition software.

In another example, analyzing the attribute of the electrical panel may include identifying characteristics of each electrical breaker electrically coupled to the electrical panel based on the one or more symbols. The characteristics of the electrical breaker may include at least one of a voltage rating, an amperage rating, a single pole configuration, a double pole configuration, tandem breakers and/or substantially any other characteristic or component of the electrical panel. In some cases, the image recognition software may include a deep learning convolutional neural network model.

In another example, calculating the electrical capacity of the electrical panel may include determining a maximum electrical power output of the panel based at least in part on the attribute of the electrical panel. Calculating the electrical capacity of the electrical panel may further include estimating an average electrical power output of the electrical panel based at least in part on the attribute of the electrical panel. Calculating the electrical capacity of the electrical panel may further include comparing the maximum electrical power output to the average electrical power output to determine the electrical capacity. In some cases, estimating an average electrical power output of the electrical panel may be further based on an estimated seasonal load of an electrical breaker electrically coupled to the electrical panel.

In another example, the report may include a recommendation for modifying the electrical panel to increase the electrical capacity.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
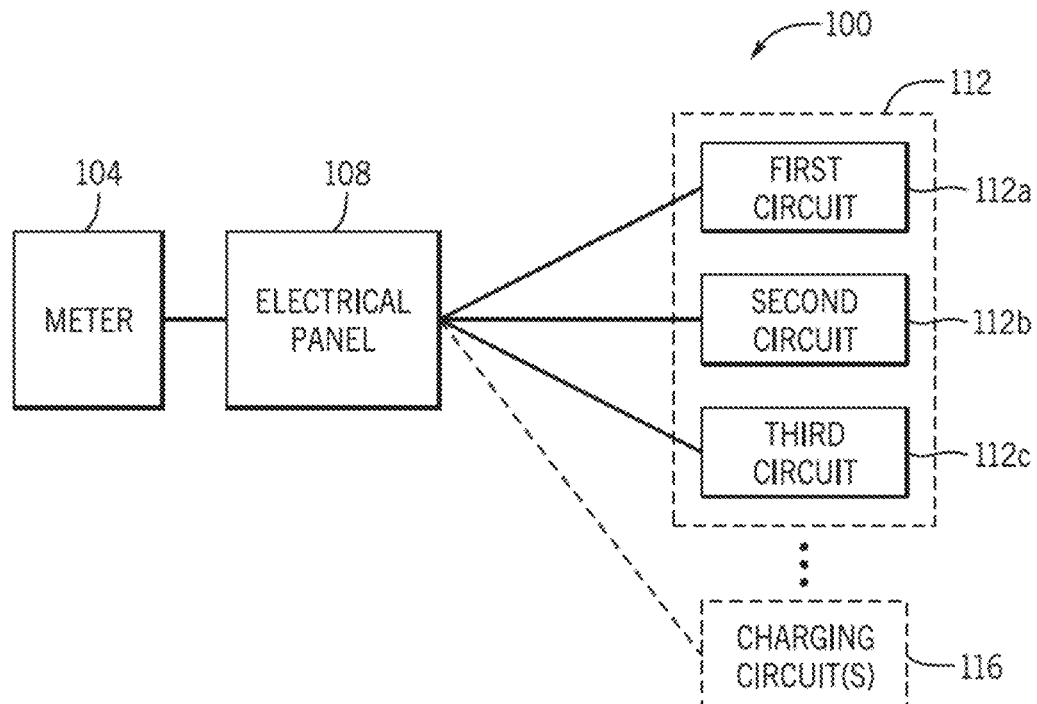
FIG. 1 depicts a block diagram of an electrical system, including a meter, an electrical panel, and associated secondary circuits.

The description that follows includes sample systems, methods, and apparatuses that embody various elements of the present disclosure. However, it should be understood that the described disclosure may be practiced in a variety of forms in addition to those described herein.

The following disclosure relates generally to systems and techniques for analyzing an electrical panel. An electrical panel may broadly encompass any collections of components configured to divide an input electrical power to multiple secondary circuits. Without limitation, the electrical panel may include or be or encompass an electrical box, switchgears, disconnect switches, breakers, overcurrent protectors (or other failsafe devices), grounding components, and associated circuitry that cooperate to divide the input electrical power. In one example, the electrical panel may be a residential panel, a commercial panel, an industrial panel or substantially any other type of panel that may be associated with a use or structure.

An electrical panel of any type may be generally capable of supporting numerous secondary circuits based on multiple factors including panel loading. In-service electrical panels come in a variety of configurations and may have a number of secondary circuits that may be less than the maximum number of secondary circuits that the particular panel is capable of supporting. As such, in-service electrical panels may be capable of supporting the electrical load and associated mechanical components for additional secondary circuits, such as a secondary circuit associated with an electric vehicle charging station.

For example, electric vehicles may be charged by plugging in or otherwise electrically coupling the vehicle with a charging station. Electric vehicle use and adoption may be limited by the availability of the charging station or other infrastructure for transferring power to the vehicle. It may therefore be desirable to incorporate a charging station with an existing in-service electrical panel. However, facility-specific electrical characteristics of a given panel, such as existing loads, cable sizes, and service capacities may hinder the ability to determine whether another secondary circuit can be added and/or whether the load requirements of the circuit, such as that for an electrical vehicle charging station (or other use), are compatible with the panel.

The systems and techniques of the present disclosure may mitigate such hindrances, in part, by using image recognition and analysis to determine the condition of the panel and suitability of the panel for additional secondary circuits, such as those associated with a charging station. Broadly, an analysis module, such as that of a computer vision software, may be used to analyze the physical configuration of a given in-service panel. Based on the image of the existing equipment, the analysis module may assess facility-specific electrical characteristics such as existing loads, breaker characteristics, panel characteristics, cable sizes, and service capacities. Such assessment may provide information that can be used to determine the suitability of the panel to support a charging station. Sample elements analyzed by the analysis module include, without limitation, electrical load capacity, availability at the panel for additional circuits, utility service voltage, and amperage rating, among others. The image recognition, analysis, determination, and associated functions may be supported by artificial intelligence, including deep learning modules, in order to promote a streamlined and at-least semi-automated charging station installation process.

In one implementation, the systems and techniques described herein may use deep learning image recognition technology to recognize different areas of interest on the panel. Sample areas of interest may include, without limitation, a main switch, a single switch, a double pole switch, empty slots, and so on. Each area of interest may in turn be analyzed, such as through optical character recognition (OCR) to recognize important text of the area of interest, including text associated with an amperage of the recognized component. Particular attributes of electrical panel of interest may be calculated including, without limitation, an overall electrical power capacity, an electrical load of the panel, and an unused electrical power capacity. Electrical vehicle charging station specific logic may be implemented in order to make a recommendation regarding whether a specific charging station (and/or use with a particular electrical vehicle) may be suitable for installation at the electrical panel of interest. Image metadata may also be used to enhance the analysis. For example, information can be optionally extracted from the image or associated data to identify various tags, such as GPS coordinates, image settings, or dates, some or all of which may be used to evaluate regional specific attributes (utility, service/building type) or improve OCR by means of preprocessing image adjustments.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

With reference to FIG. 1, a block diagram of an electrical system 100 is depicted. The sample electrical system 100 may be associated with a residential, commercial, industrial, or other appropriate use. The systems and techniques described herein may be configured to analyze the electrical system 100 or components thereof for determining, among other items, whether an electric vehicle charging station may be added to the electrical system.

In the example of FIG. 1, the electrical system includes a meter 104, an electrical panel 108, and secondary circuits 112. The meter 104 may monitor a flow of electric input power to the electrical panel 108. The meter 104 may therefore be associated with a main power supply or other power source, such as that associated with a power grid, solar/battery array, and so on. The electrical panel 108, as described herein, includes any collection of components configured to divide the input electrical power and cause or allow the divided power to reach one or more secondary circuits, such as the secondary circuits 112 shown in FIG. 1.

The secondary circuits 112 of FIG. 1 includes a first circuit 112a, a second circuit 112b, and a third circuit 112c. Each of the secondary circuits 112 may be used to supply electrical power to a designated area/for a designated purpose. In the case of a residential installation, each secondary circuit may serve a particular room (e.g., kitchen), collection of rooms (e.g., upstairs bedrooms), appliance (e.g., clothes dryers), and so on. In the example system 100, the first circuit 112a, second circuit 112b, and the third circuit 112c may be existing, in-use secondary circuits of the electrical panel 108. The electrical panel 108 may or may not be capable of supporting (e.g., physically with space requirements and electrically with respect to load) additional secondary circuits, such as one or more secondary circuits associated with an electrical vehicle charging station.

Accordingly, FIG. 1 shows charging circuit(s) 116 as optionally being associated with the secondary circuits 112. The charging circuit(s) 116 may be representative of circuits used to provide electrical power to an electrical vehicle charging station. Because the electrical panel 108 of FIG. 1 is in-use, the charging circuit(s) 116 may not necessarily be appropriate for installation with the electrical panel 108. For example, the electrical panel 108 may be physically unable to accommodate an additional breaker and associated components that would facilitate the division of the power supply by the electrical panel 108 to the charging circuit(s) 116. As another example, the electrical panel 108 may be unable to safely accommodate an electrical load associated with the charging circuit(s) 116/charging of an electric vehicle at the charging station.

Figure 2:
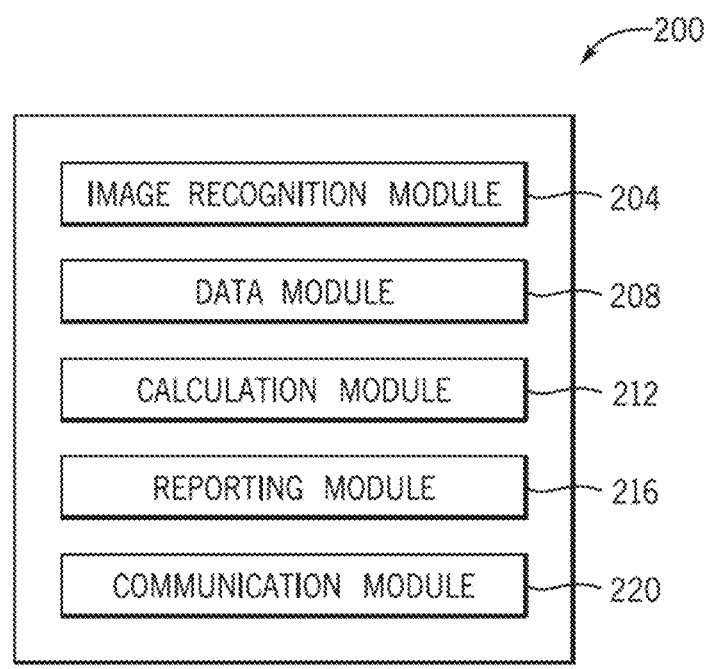
FIG. 2 depicts a block diagram of a panel analysis module.

The system and techniques of the present disclosure may be used to analyze an electrical panel, such as the electrical panel 108, in order to determine whether the charging circuit(s) can be added. To facilitate the foregoing, FIG. 2 depicts a block diagram of a panel analysis module 200 according to examples of the present disclosure. The analysis module 200 may be configured to execute one or more functions described herein for analyzing the electrical panel. The analysis module 200 may be executed, in one implementation, via a computing device, including a mobile computing device, such as that described in greater detail below with reference to FIG. 7.

The panel analysis module 200 is shown as including an image recognition module 204, a data module 208, a calculation module 212, a reporting module 216, and a communication module 220. For purposes of illustration, the image recognition module 204 may be used to collect images of electrical panels. In some cases, the images may be used to initially establish a dataset that can be used to train the deep learning image detector and/or other artificial intelligence based learning module. In other cases, commercially available, crowdsourced, or otherwise preexisting datasets may be used. Numerous images of various different styles and manufacturers of electrical panels for deep learning training may increase the reliability and accuracy of panel detection. For example, the image recognition module 204 may be used to train the image detector to recognize various notable aspects or features of an electrical panel (e.g., main breaker switch, single pole breakers, empty slots, double pole breakers, and stamped voltage indicators). In some cases, a deep learning convolutional neural network (CNN) model may be used for image recognition.

In this regard, the image recognition module 204 may also be configured to process a new image of an in-service panel and recognize one or more features of the panel, in part, using the deep learning image detector, as trained based on the panel dataset. Initially, the image recognition module 204 may operate to analyze the new image of the in-service electrical panel and identify one or more panel features, such as the main breaker switch, single pole breakers, empty slots, double pole breakers described above. Each respective portion of the image including the panel features may be designated, such as via a bounding box or other marker that designates the portion of the image including the panel feature. Image recognition techniques may then be performed on the portion of the image bounded by the bounding box. For example, the panel feature may include text that includes information associated with the panel feature, such as a service amperage. Image recognition may be used to identify the text and associate the text with the panel feature represented in the bounding box.

Often the text is oriented at an angle other than horizontal. For example, the text may run the length of a switch handle that is generally perpendicular with the ground or horizontal direction. In some cases, the text may be oriented more than 90 degrees, due to a random and unpredictable combination of text distortion due to the angle of the switch itself and/or the source image itself (e.g., due to errors and inconsistency in the angle at which the image was captured). Accordingly, and shown and described herein with reference to FIGS. 4A-4C, the image recognition module 204 may operate to rotate the portion of the image (e.g., the portion bounded by the bounding box and representative of the identified panel feature) 90 degrees in both a clockwise manner and 90 degrees in a counterclockwise manner. Each of the three images may be analyzed to determine which orientation of text is most recognizable via optical character recognition.

The results of the image recognition module 204 may be stored in the data module 208. For example, the image recognition module 204 may determine a value of main breaker amperage, a quantity and type of secondary breakers and associated amperage, as well as other values, such as a quantity of empty slots of the electrical panel, and other data points. In some cases, the data module 208 may also include data associated with a geographic location of the panel (e.g., including geolocation of the metadata), various parties associated with the panel (e.g., an owner of the electrical panel, an energy management provider, a municipality, or a supplier of electric vehicle charging equipment, and so on), a type of electrical panel or breaker (e.g., manufacture, size, rated wattage, age, and so on), a location of the panel (e.g., residential, commercial, industrial, and so) and substantially any other information that may be used to analyze the electrical panel in conjunction with the data collected and determined by the image recognition module 204.

The calculation module 212 may broadly be configured to analyze the output of the image detector and text recognition and determine metrics associated with the electrical panel, including a main-to-actual amperage ratio, estimated panel power availability, and available breaker slots, among other metrics. Additionally, the calculation module 212 may be used to determine the meaning or associate recognized labels and text on the panel, for example, such as those that may give insight to approximate baseloads, peak, or seasonal loads. Example calculations of the calculation module 212 are described in greater detail below with reference to the electrical panel examples of FIGS. 3A and 3B.

The reporting module 216 may be configured, in cooperation with the calculation module 212, to propose one or more courses of action with respect to the electrical panel and/or with respect to whether an electrical vehicle charging station may be installed at the charging station. As one example, the reporting module 216 may determine whether an electrical panel upgrade is needed. This may be the case where the electrical panel may be unable to support the anticipated electrical load or other requirements of charging circuit(s) associated with a charging station. If the electrical panel is recommended for upgrade, the reporting module 216, in part based on a street address of the panel and/or other geolocation marker, may determine the electric utility company, permitting authority entity, and/or other actions associated with a panel upgrade.

Additionally or alternatively, the reporting module 216 may propose that certain circuits be combined with tandem breakers in order to make room for additional circuits, approximate baseloads vs peak or seasonal loads from labels for engineers to further analyze, estimate panel service upgrade case, which may be based using the geolocation/satellite imagery. Other determinations may be made using the reporting module 216, including but not limited to: (i) identifying the likelihood of another upstream load center in between the panel and service meter, (ii) parsing/classifying a panel make/model/type (e.g., residential, commercial, and so on) for purposes of determining compatible new hardware or the requirement of the panel needing to be replaced (due to new code requirements); and/or (iii) reading, using OCR, identification labels (including, for example, handwritten labels), paired with breaker size/configuration to estimate periodicity impact of the downstream load to the net service load; and/or (iv) reading, using OCR, the meter identifier(s) to use to correlate and request historical data from online data sources. In other cases, other insights may be determined. The communication module 220 may allow these and other determination to reported to members of a network, including an owner of the electrical panel, an energy management provider, a municipality, or a supplier of electric vehicle charging equipment, among others.

Figure 3A:
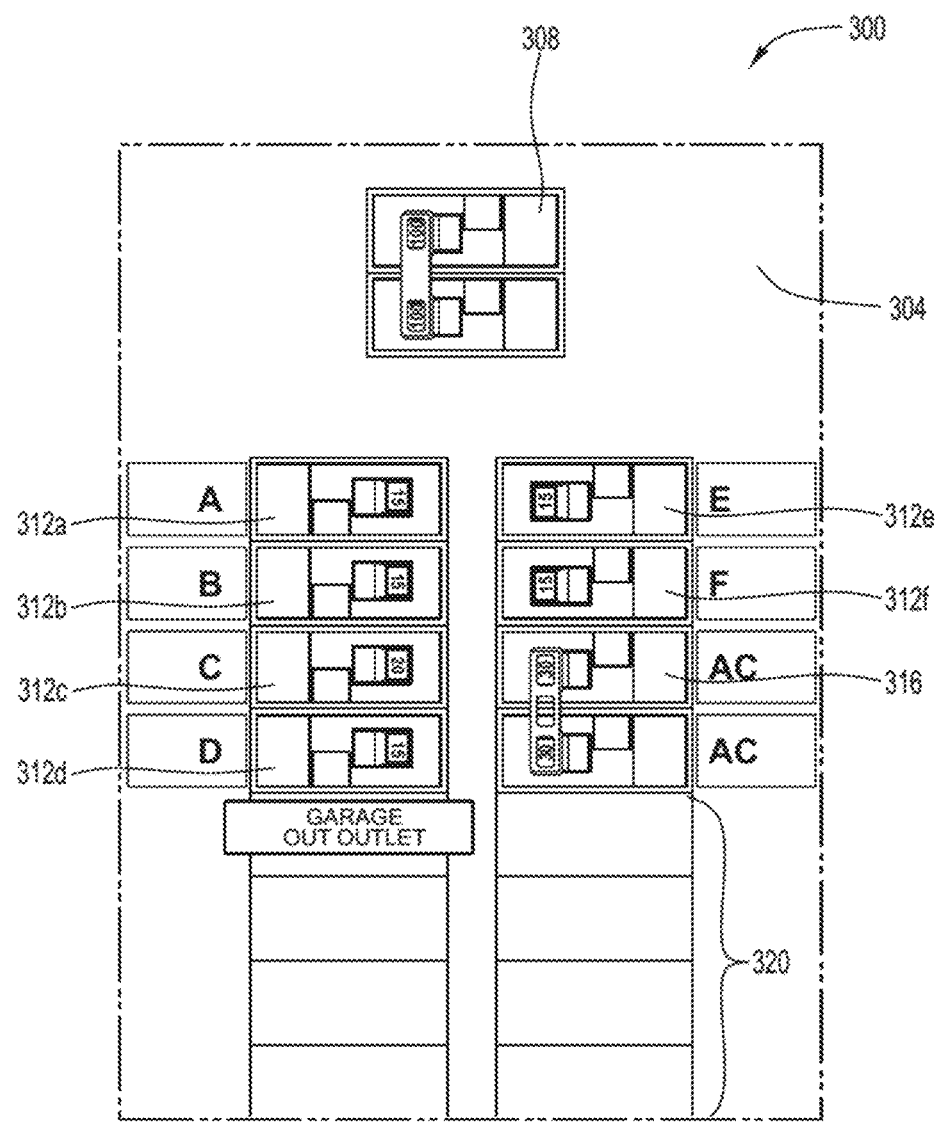
FIG. 3A depicts an image of a panel.

With reference to FIGS. 3A-4C, an analysis and evaluation of a sample electrical panel is shown and described according to the systems and techniques described herein. For example, FIG. 3A shows an image 300. The image 300 may an image captured by a user, such as with a camera of a portable electronic or other device. The image 300 shows an electrical panel 304, such as any of the electrical panels described herein. The electrical panel 304, for purposes of illustration, may be a residential electrical panel with a 240V service voltage. The electrical panel 304 is shown as including a main breaker 308. The main breaker 308 may operate as a main service disconnect. The electrical panel 304 is further shown as including a collection of secondary circuits which may be represented, visually, by a first single breaker 312a, a second single breaker 312b, a third single breaker 312c, a fourth single breaker 312d, a fifth single breaker 312e, a sixth single breaker 312f, and a 2-pole breaker 316. The electrical panel 304 is also shown with a collection of empty slots 320. The empty slots 320 may be configured to accommodate addition breakers or other hardware to support additional secondary circuits, such as those associated with an electric vehicle charging station.

Figure 3B:
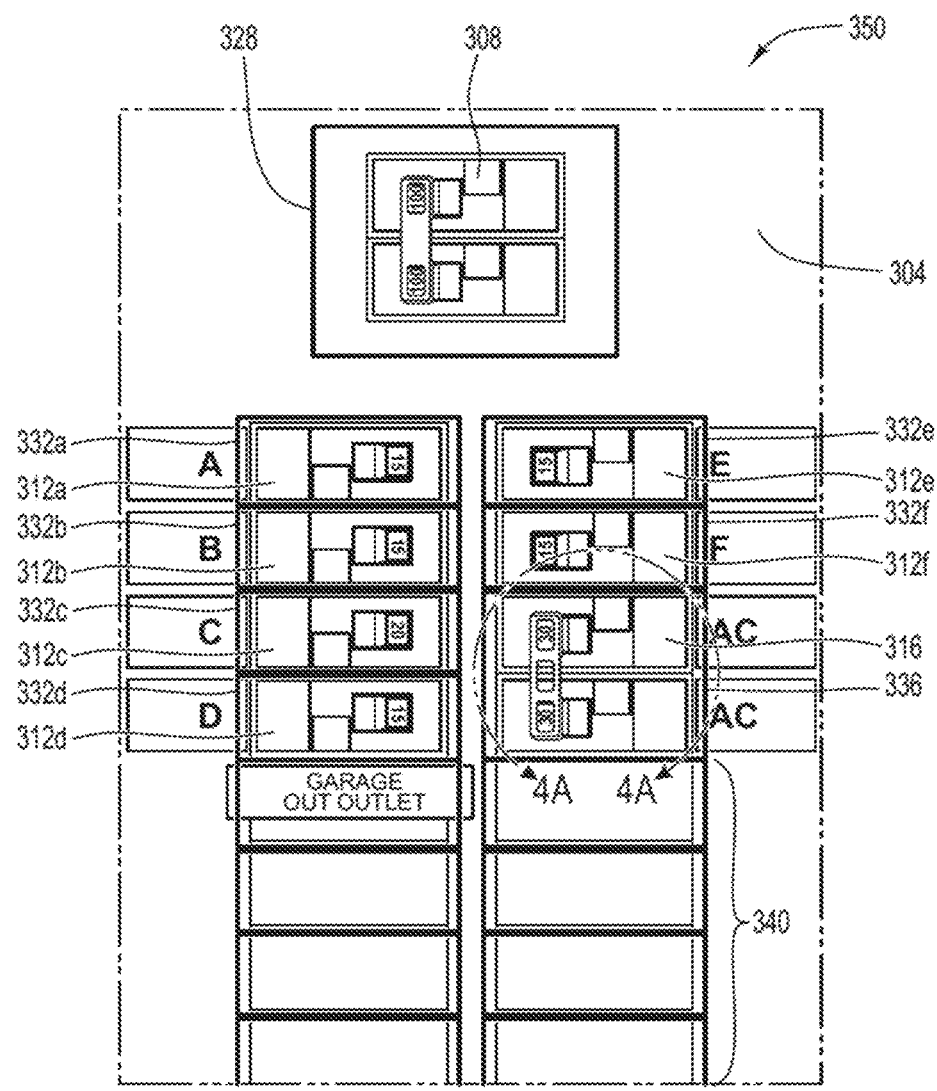
FIG. 3B depicts a representation of the image of FIG. 3A with an overlay associated with an image recognition operation.

The systems and techniques described herein, for example, through operation of the panel analysis module 200, may be configured to identify portions of the image 300 associated electrical components of the panel 304. For example, and as described above, deep learning-based image recognition may be applied to the image 300 to identify which portion of the image may correspond to an electrical component (e.g., the main breaker 308, breakers 312a-312f, and so on). With reference to FIG. 3B, a representation 350 of the image 300 is depicted in which a collection of overlays or bounding boxes (e.g., 328 and 332a-e) are shown over particular portions of the image. The bounding boxes may be a portion of the image 300 that the panel analysis module 200, or computer vision software more generally, determines includes an image of an electrical component of the electrical panel 304. For example, the panel analysis module 200 may determine a bounding box 328 as a portion of the image indicative of the main breaker 308. As a further example, the panel analysis module 200 may determine a bounding box 332a as a portion of the image indicative of or associated with the first single breaker 312a. As a further example, the panel analysis module 200 may determine a bounding box 332b as a portion of the image indicative of the second single breaker 312b. As a further example, the panel analysis module 200 may determine a bounding box 332c as a portion of the image indicative of the third single breaker 312c. As a further example, the panel analysis module 200 may determine a bounding box 332d as a portion of the image indicative of the fourth single breaker 312d. As a further example, the panel analysis module 200 may determine a bounding box 332e as a portion of the image indicative of the fifth single breaker 312e. As a further example, the panel analysis module 200 may determine a bounding box 332f as a portion of the image indicative of the sixth single breaker 312f. As a further example, the panel analysis module 200 may determine a bounding box 336 as a portion of the image indicative of the 2-pole breaker 316. As a further example, the panel analysis module 200 may determine a collection of bounding boxes 340 as a portion of the image indicative of the collection empty slots 320, including having bounding boxes for each individual slot, as shown in the example of FIG. 3B.

One result of the analysis of FIG. 3B may be the indication of the number and type of electrical components of the electrical panel 304. The panel analysis module 200 may further operate to determine information for each of the electrical components, such as amperage or other value that may be used to assess the suitability of the panel for additional secondary circuits. As one example, a portion of the image represented by the bounding box is analyzed for numerical information. The numerical information may then be associated with a property or characteristic of the identified electrical component.

Figure 4A:
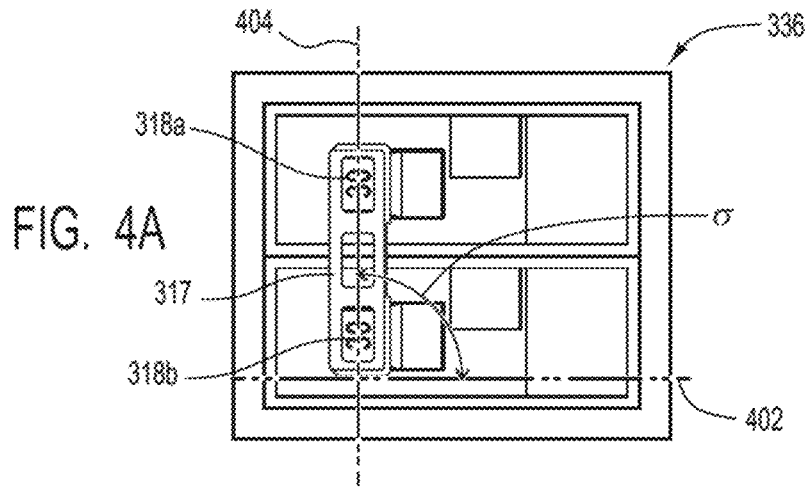
FIG. 4A depicts a portion of the representation of FIG. 3A taken at detail 4A-4A of FIG. 3B.

For example, and as shown in FIG. 4A, a portion of image 300 represented by the bounding box 336 is shown. As described above, the bounding box 336 includes a portion of the image 300 indicative of the 2-pole breaker 316. The 2-pole breaker 316 may include a handle 317 having a first text portion 318a and second text portion 318b associated therewith. In this case, each of the first text portion 318a and the second text portion 318b include the text "30," which may be indication of a 30 amp service amperage. As shown in FIG. 4A, the text portions 318a, 318b are arranged along a text axis 404. The text axis 404 may be arranged at an angle from a horizontal axis 402 (e.g., a horizontal axis of the image) by an angle σ. The angle σ may be larger than ninety degrees, due to a number of factors including, for example, the orientation of the captured image, lens distortion, and the orientation of the handle 317 in the electrical panel 304. The arrangement of the text of the first and second text portion 318a, 318b along the text axis 404 at the angle σ may reduce the accuracy of the optical character recognition to recognize the text as "30."

Figure 4B:
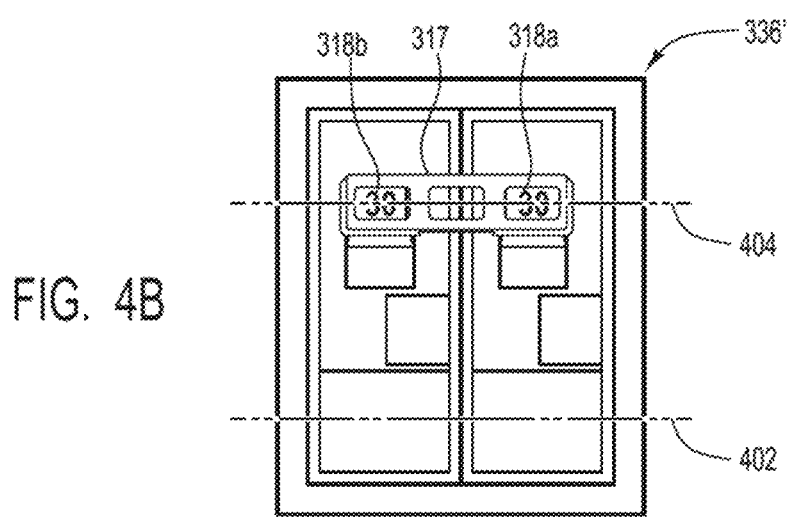
FIG. 4B depicts the portion of FIG. 4A in a first orientation.

Accordingly, and as described herein, the panel analysis module 200 may operate to rotate the image within bounding box 336 in a first clockwise direction a produce a first modified bounding box 336', as shown in FIG. 4B. The first modified bounding box 336' may be a ninety degree rotation, clockwise, of the bounding box 336. As shown in FIG. 4B, the rotation causes the text axis 404 to correspondingly rotate. The text axis 404 is therefore shown in FIG. 4B at an almost parallel orientation to the horizontal axis 402 with the numerals "30" generally in an upright position. By re-orientating the image in this manner, the accuracy of the optical character recognition may be enhanced. For example, the optical character recognition is more likely to recognize the text portions 318a, 318b as including the text "30" in the orientation of the first modified bounding box 336' as compared with that of the bounding box 336 of the original orientation.

Figure 4C:
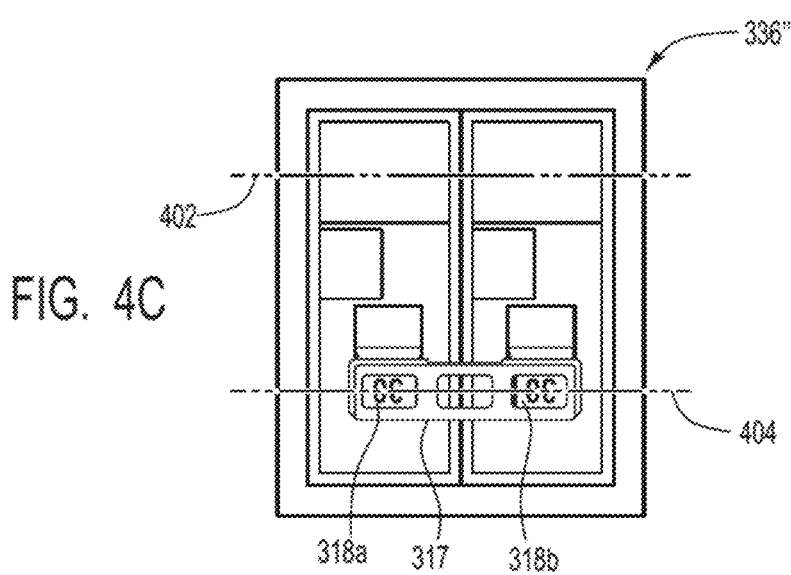
FIG. 4C depicts the portion of FIG. 4A in a second orientation.

The panel analysis module 200 may also operate to rotate the image within bounding box 336 in a second counter-clockwise direction to produce a second modified bounding box 336", as shown in FIG. 4C. The second modified bounding box 336" may be a ninety degree rotation, counterclockwise, of the bounding box 336 shown in FIG. 4A. As shown in FIG. 4C, the rotation causes the text axis to correspondingly rotate. The text axis 404 is therefore shown in FIG. 4C at an almost parallel orientation to the horizontal axis 402. However, with the rotation of the bounding box in this manner, the numerals "30" are generally in an upside-down position. As such, the optical character recognition may be unable to determine the specific text of the first and second text portions 318a, 318b. The panel analysis module 200 may therefore compare a result of the image recognition for the bounding box 336, first modified bounding box 336', and the second modified bounding box 336" to determine which orientation is best suited for determining a value of the text portions 318a, 318b as including the text "30."

The panel analysis module 200 may further operate to associate the text "30" with an amperage value of the breaker 316. For example, the panel analysis module 200, using the image-recognition techniques described above, may identify the text "30" as being the physically largest markings on the breaker 316. The panel analysis module 200 may apply a set of rules to associate the physically largest text or markings on the breaker 316 as text that is indicative of a service amperage of the breaker 316. Additionally or alternatively, the panel analysis module 200, using the image-recognition techniques described above, may identify the text "30" as being arranged on the handle 317. The panel analysis module 200 may then apply a set of rules to detect a handle in the image and to associate the text positioned on the handle as text that is indicative of a service amperage of the breaker 316. In some cases, where multiple numbers are detected, the panel analysis module 200 may filter numbers for possible standard amperages (e.g., 15, 20, 25, 30, and so) and select the number that is the largest if multiple numbers remain. Additionally or alternatively, the panel analysis module 200 may obtain information associated with the location of the amperage information based on the panel type, brand, make and so on. Additionally or alternatively, a Convolution Neural Network (or other related software) may be used in connection with the panel analysis module 200 to analyze the region of/around the breaker switch and detect/draw a bounding box around the "amperage indication area." This bounding box may be defined on the breaker itself (e.g. on the switch) or near the breaker (e.g. a label adjacent to the breaker), as appropriate for a given application.

The panel analysis module 200, using the calculation module 212 and/or various other modules, may proceed to associate the recognized value of the text with a characteristic of the associated electrical component of the bounding box for which the text was recognized within. In the present example, the panel analysis module 200 may recognize the text and as amperage values for breaker components as appear in Table 1.

TABLE 1

Amperage value for electrical panel components.

| Electrical Panel Component | Amperage |
| --- | --- |
| Main Breaker | 100 Amps |
| Single Breaker | 15 Amps |
| Single Breaker | 15 Amps |
| Single Breaker | 20 Amps |
| Single Breaker | 15 Amps |
| Single Breaker | 15 Amps |
| Single Breaker | 15 Amps |
| 2-Pole Breaker | 20 Amps |

The panel analysis module 200 may use the values represented in Table 1 to calculate, among other items, an overall electrical power capacity of the electrical panel, an electrical load of the panel, and suitability of the electrical panel for additional secondary circuits, such as circuits associated with a charging station. Broadly, while many calculations are possible and contemplated herein, for purposes of illustration, an example set of calculations is presented herein below to demonstrate the functionality of the calculation module 212 and panel analysis module 200 more generally. In this regard, rather than limiting, it will be appreciated that such calculations are illustrative of the calculation module 212 operating in conjunction with the other module of the analysis module 200 to analyze an electrical panel and determine one or more characteristics of the panel.

In one example, the baseline load of the electrical may be defined as:

single pole breakers>30 Amps:0.1 factor, and double pole breakers and single pole breakers>=30 A: 0 factor In other cases, other weighting metrics may be used for determining a baseline load or other pattern usage estimate technique.

The maximum load for the electrical panel may be defined as:

Min [Σ(Double pole breaker loads,single pole breaker loads>=30 A,0.5 factor single pole breaker loads<30 A),Summation of breaker powers]

In other cases, other calculations may be used to determine a maximum load of the electrical panel.

The panel analysis module 200, using the calculation module 212 and/or various other modules, may proceed to calculate power associated with each breaker. In the present example, the panel analysis module 200 may, using a safety factor of 0.8, calculate power associated with each breaker, as appears in Table 2.

TABLE 2

Electrical Panel Component Power

| Electrical Panel Component Power | Calculation | Resulting Power |
|---|---|---|
| Main Breaker Power | 100 Amps * Assumed 240 V * 0.8 | 19.2 kW |
| Single Breaker Power | 15 Amps * 0.8 * 120 V | 1.44 kW |
| Single Breaker Power | 15 Amps * 0.8 * 120 V | 1.44 kW |
| Single Breaker Power | 20 Amps * 0.8 * 120 V | 1.92 kW |
| Single Breaker Power | 15 Amps * 0.8 * 120 V | 1.44 kW |
| Single Breaker Power | 15 Amps * 0.8 * 120 V | 1.44 kW |
| Single Breaker Power | 15 Amps * 0.8 * 120 V | 1.44 kW |
| 2-Pole Breaker Power | 30 Amps * 0.8 * 240 V | 5.76 kW |

The assumed 240V of Table 2 may be determined or obtained via direct input and/or by analyzing a variety of factors, such as panel location, image location, facility type, panel board characteristics, and so on.

The panel analysis module 200, using the calculation module 212 and/or various other modules, may proceed to calculate the maximum load of the electrical panel. The steps of such example appear in Table 3.

TABLE 3

Calculated Maximum Panel Load

| Operation | Calculation | Result |
|---|---|---|
| Estimated baseline load | 0.1 (1.44 + 1.44 + 1.92 + 1.44 + 1.44 + 1.44) | 0.91 kW |
| Estimated maximum load | 0.5 (1.44 + 1.44 + 1.92 + 1.44 + 1.44 + 1.44) + 5.76 | 10.32 kW |
| Summed Power of Breakers w/o usage pattern estimations: | 1.44 + 1.44 + 1.92 + 1.44 + 1.44 + 1.44 + 5.76 | 14.88 kW |
| Maximum Load | min (10.32, 12.96) | 10.32 kW |

The panel analysis module 200, using the calculation module 212 and/or various other modules, may proceed to determine a variety of calculate attributes associated with the electrical panel that appear in Table 4.

TABLE 4

Determined Electrical Panel Values.

| Electrical Panel | Result |
|---|---|
| Estimated Service Power/Main Power | 19.2 kW |
| Estimated Baseload/Maximum Power Demand | 0.91 kW/10.32 kW |
| Estimated Available Capacity Power: | 8.88 kW |
| Estimated Available Capacity Amps @ service voltage (i.e. 2 pole) | .88 kW/240 * 1.25 = 46.25 A |
| Total Main Service Amperage: | 100 A |
| Service Voltage | 240 V (Residential) |
| Spare Breaker Slots: | 7 |

The service voltage of 240 V may be determined or assumed based on the electrical panel being a residential panel. The panel may be determined to be a residential panel based on identified panel information (make/model/lineup) and/or GPS info extracted from the image and then referenced or recognized in a panel library/database or looked up through similar channels.

The information represented in Table 4 may be used by the analysis module to evaluate the suitability of the electrical panel 304 for additional secondary circuits. For example, the panel analysis module 200 may compare the estimated available capacity with the estimated capacity required for one or more secondary circuit associated with the charging station. If the electrical panel is found to not support additional secondary circuits, the panel analysis module 200 may generate one or more reports to recommend courses of action for upgrading the panel.

It will be appreciated that the analysis of FIGS. 3A-4C is described with respect to one example electrical panel. The systems and techniques described herein are configured to analyze a plurality of electrical panels of various different types and configurations, including residential, commercial, and industrial panels having different components and characteristics. In this regard, the systems and techniques may be used to determine one or more panel characteristics, including available slots and power capacity, for adaptation for electrical vehicle charging stations in a variety of settings.

Figure 5A:
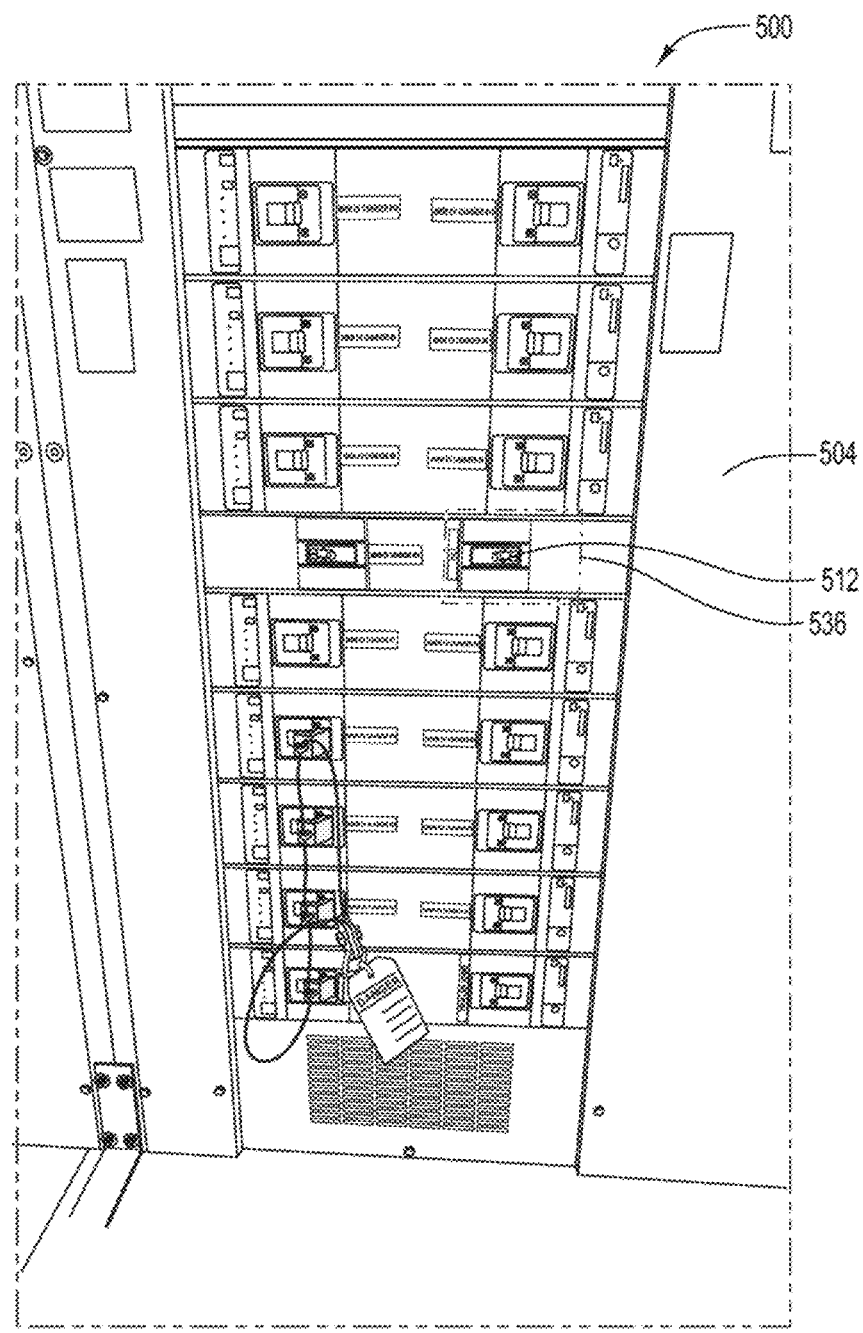
FIG. 5A depicts an image of another panel.
Figure 5B:
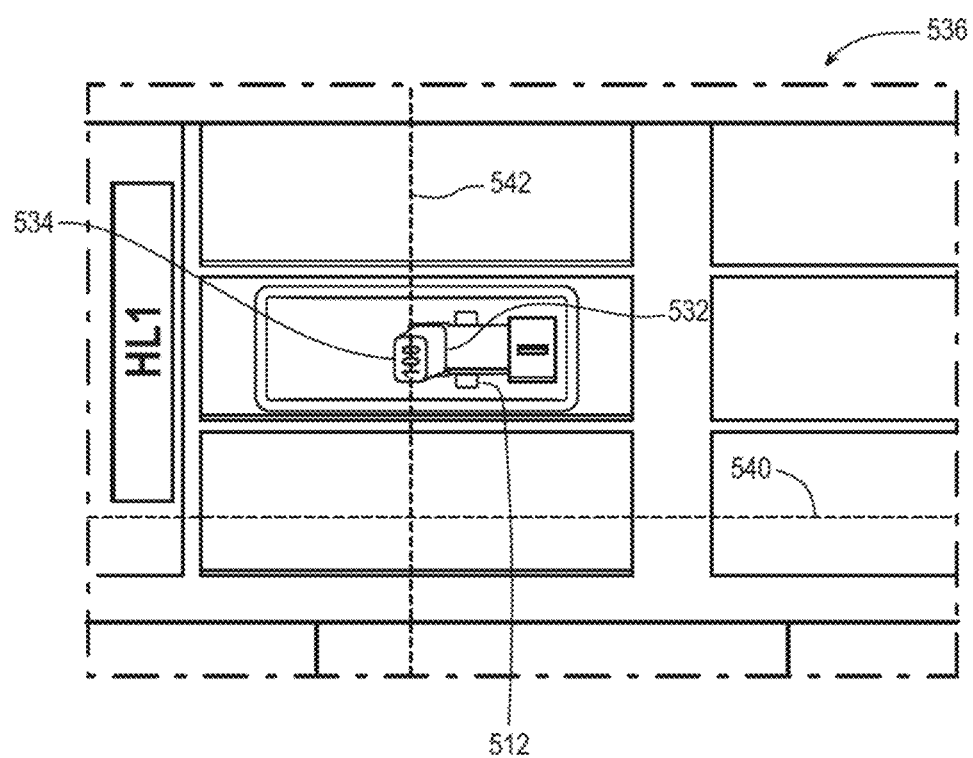
FIG. 5B depicts a portion of the image of FIG. 5A associated with an image recognition operation.

For purposes of illustration, another example analysis and evaluation of a sample electrical panel is shown with reference to FIGS. 5A and 5B. With reference to FIG. 5A, an image 500 is shown including an electrical panel 504. The electrical panel 504 may be a different type of electrical panel and/or have different characteristics (e.g., with respect to panel components, capacity, service-type, and so on) as compared with the panel 304. For example, the electrical panel 504 may include a breaker 512. The breaker 512 may be a different type of breaker, including having a different amperage or rating as compared with the breakers shown and described with reference to FIGS. 3A-4C. The electrical panel 504 may also include a different number of breakers or other components, which may occupy a larger amount of space on the electrical panel 504, for example, due to a service-type of the panel 504.

Notwithstanding the foregoing distinctions, the systems and techniques described in relation to FIGS. 3A-4C may be used to analyze the panel 504 and determine one or more characteristics of the panel 504. For example, the panel analysis module 200 described herein, may be configured to identify portions of the image 500 that are associated with electrical components of the panel 504. The deep learning-based image recognition may be applied to the image 500 to identify which portion of the image may correspond to an electrical component (e.g., the breaker 512). With reference to FIG. 5A, the image 500 may be overlaid with a bounding box 536. The bounding box 536 may be a portion of the image 500 that the panel analysis module 200, or computer vision software more generally, determines includes an image of an electrical component of the electrical panel 504, such as being a portion of the image 500 indicative of the breaker 512.

The panel analysis module 200 may further operate to determine information for each of the identified electrical components of the panel 504, such as the breaker 512. For example, and as shown in FIG. 5B, a detail view of the portion of the image 500 represented by the bounding box 536 is shown. As shown in FIG. 5B, the breaker 512 may include a handle 532 and a text portion 534. The text portion 534 may indicate one or more characteristics of the breaker 512, such as amperage. The panel analysis module 200 may be configured to identify the text portion 534 as including the text "100," which may be indicative of a 100 amp service amperage. The text portion 534 may be arranged along a text axis 542 that is at an angle that is greater than 90 degrees from a horizontal axis 540. In this regard, the panel analysis module 200 may be configured to rotate the bounding box 536 in order to increase an accuracy of the optical character recognition of the text portion 534 to recognize the text as "100," substantially analogous to the techniques described in relation to FIGS. 4A-4C.

The panel analysis module 200, using the calculation module 212 and/or various other modules, may further proceed to associate the recognized value of the text with a characteristic of the associated electrical component of the bounding box for which the text was recognized within. In the present example, the panel analysis module 200 may recognize the text as amperage values for breaker component 512. The panel analysis module 200 may conduct similar image recognition operations for each identified component of the panel. The panel analysis module 200 may further use the characteristic of the identified component to calculate, among other items, an overall electrical power capacity of the electrical panel, an electrical load of the panel, and suitability of the electrical panel for additional secondary circuits, such as circuits associated with a charging station.

Figure 6:
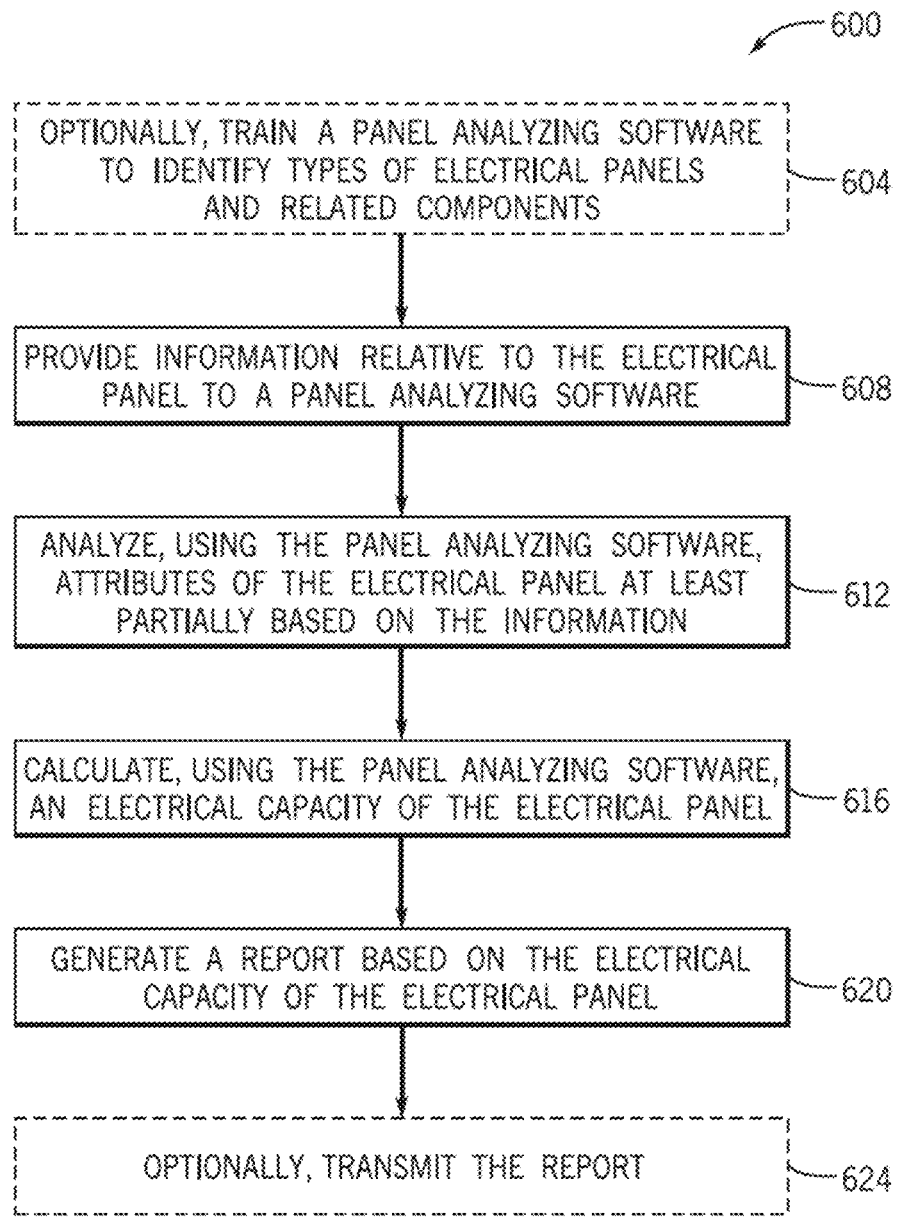
FIG. 6 depicts a flow diagram for generating and sending an electrical panel capacity report.
Figure 7:
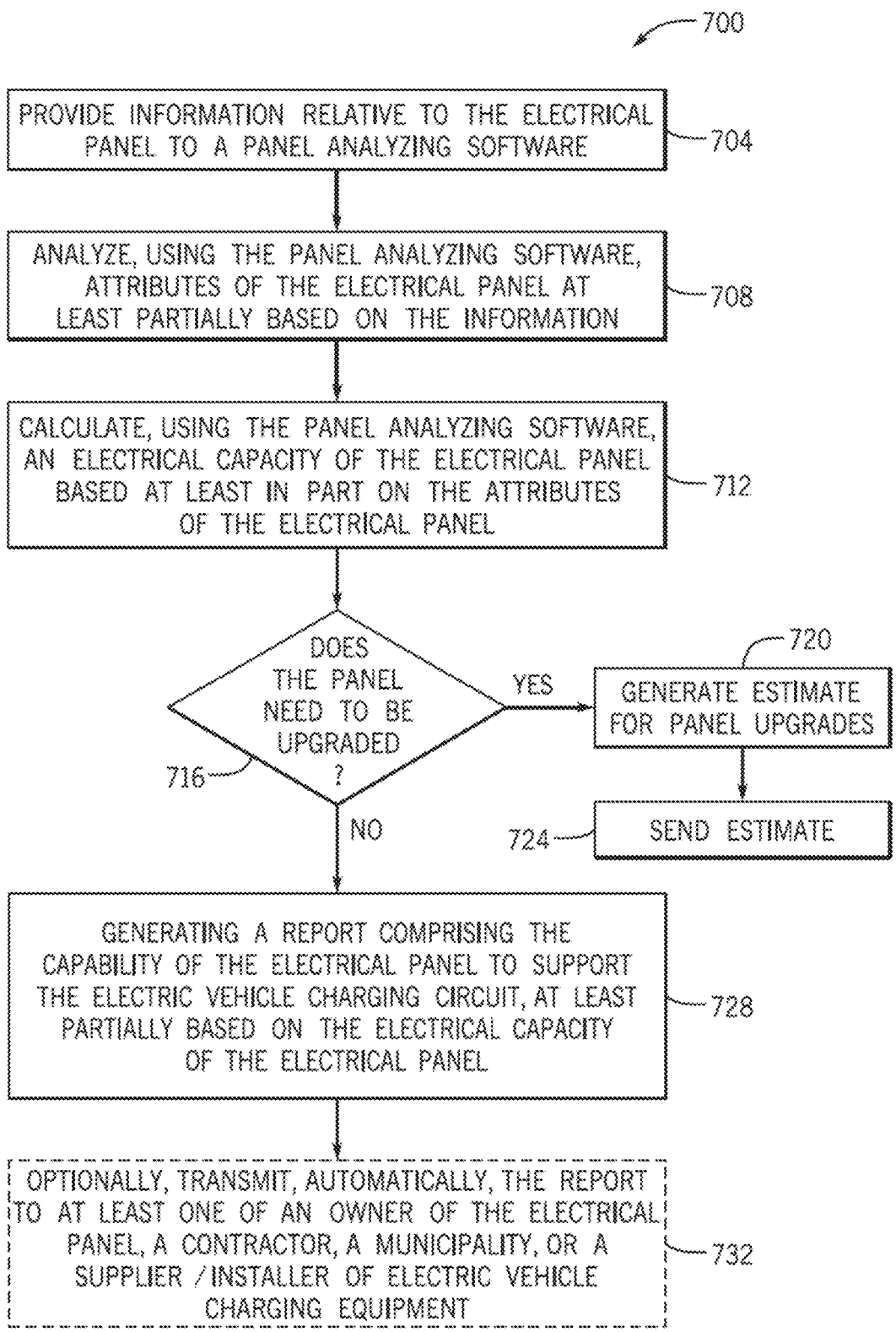
FIG. 7 depicts a flow diagram for evaluating a panel upgrade.

To facilitate the reader's understanding of the various functionalities of the embodiments discussed herein, reference is now made to the flow diagram in FIGS. 6 and 7, which illustrates processes 600 and 700, respectively. While specific steps (and orders of steps) of the methods presented herein have been illustrated and will be discussed, other methods (including more, fewer, or different steps than those illustrated) consistent with the teachings presented herein are also envisioned and encompassed with the present disclosure.

With reference to FIG. 6, a method 600 is shown directed to determining a capability of an electrical panel. At operation 604, a panel analyzing software is optionally trained to identify types of electrical panels and related components. For example, and with reference to FIG. 2, the image recognition module 204 may be trained using a collection of images of electrical panels. In some cases, the images may be used to initially establish a dataset that can be used to train the deep learning image detector. Training images of electrical panel components may also be used.

At operation 608, information is provided to the panel analyzing software associated with or relative to the electrical panel. For example, and with reference to FIG. 2, the image recognition module 204 may receive information associated with a new image of an in-service electrical panel. The image may be captured using a camera of an electronic device, including a portable electronic device.

At operation 612, attributes of the electrical panel are analyzed, using the panel analyzing software, at least partially based on the information. For example, and with reference to FIGS. 2 and 3B, the panel analysis module 200 is configured to analyze the panel 304 and determine various electric components of the panel 304. As shown in FIG. 3B, the panel analysis module 200 may recognize one or more switches, breakers or other components. The panel analysis module 200 may designate a portion of the image as a portion including the identified electrical component (e.g., designated by a bounding box or other overlay). As described herein, the designated portion of the image may be rotated in various manner in order to identify any text included in that portion of the image.

At operation 616, an electrical capacity of the electrical panel is calculated using the panel analysis software. For example, and with reference to FIGS. 2 and 3B, the panel analysis module 200 may be used to determine an electrical capacity of the electrical panel. For example, the panel analysis module 200 may associate recognized text values with a characteristic of an electrical panel component (e.g., a "30" corresponding to a service amperage of 30 amps for a breaker included in the respective image). The panel analysis module 200 may use this information as input for one or more algorithms for determining an electrical panel capacity, as described herein in relation to FIG. 3B.

At operation 620, a report is generated based on the electrical capacity of the electrical panel. The report may include information associated with the capacity of the electrical panel. The report may further include information associated with an evaluation of whether the electrical panel could support one or more additional secondary circuits. At operation 624, the report is optionally transmitted. The report may be transmitted to an owner of the electrical panel, an energy management provider, a municipality, or a supplier of electric vehicle charging equipment, among other appropriate parties.

With reference to FIG. 7, a method 700 is shown directed to analyzing an electrical panel and evaluating the panel for a potential upgrade. At operation 704, information is provided to a panel analyzing software that is associated with or relative to the electrical panel. For example, and with reference to FIG. 2, the image recognition module 204 may be trained using a collection of images of electrical panels. In some cases, the images may be used to initially establish a dataset that can be used to train the deep learning image detector. Training images of electrical panel components may also be used.

At operation 708, attributes of the electrical panel are analyzed, using the panel analyzing software, at least partially based on the information. For example, and with reference to FIG. 2, the image recognition module 204 may receive information associated with a new image of an in-service electrical panel. The image may be captured using a camera of an electronic device, including a portable electronic device.

At operation 712, an electrical capacity of the electrical panel is calculated, using the panel analyzing software, based at least in part on the attributes of the electrical panel. For example, and with reference to FIGS. 2 and 3B, the panel analysis module 200 may be used to determine an electrical capacity of the electrical panel. For example, the panel analysis module 200 may associate recognized text values with a characteristic of an electrical panel component (e.g., a "30" corresponding to a service amperage of 30 amps for a breaker included in the respective image). The panel analysis module 200 may use this information as input for one or more algorithms for determining an electrical panel capacity, as described herein in relation to FIG. 3B.

At operation 716, a determination is made as to whether the panel needs to be upgraded, in part, based on the output from one or more of the foregoing operations 704, 708, 712. For example, the estimated available capacity of the electrical panel may be determined. Further, physical attributes associated with the panel, such as the presence and/or number of empty slots of the panel may also be determined. Based on these and other factors, the panel analysis module 200 may evaluate whether the electrical panel has sufficient available capacity to support the capacity of an additional secondary circuit associated with a charging station. The panel analysis module 200 may further evaluate whether the electrical panel had sufficient empty slots or other physical components to accommodate the physical components associated with the additional secondary circuit.

If it is determined that an updated electrical panel is required, for example, due to a lack of electrical capacity and/or lack of empty slots, the method 700 may proceed to operation 720. At operation 720, an estimate for a panel upgrade is determined. Factors, such as size, location, and history of the panel, as well as future intended use of the upgraded panel may be factored into the estimate. The method 700 may further proceed to operation 724, at which the estimate is sent.

If it is determined that an updated electrical panel is not required, for example, due to surplus of electrical capacity and/or surplus of empty slots, the method 700 may proceed to operation 728. At operation 728, a report including the capability of the electrical panel to support the electrical vehicle charging circuit at least partially based on the electrical capacity of the electrical panel is generated. The report may include any of the reports and associated characteristics and metric described above in relation to the reporting module 216 of FIG. 2. At operation 732, the report is optionally transmitted, automatically, to at least one of an owner of the electrical panel, a contractor, a municipality, or a supplier/installer of electrical vehicle charging equipment.

Figure 8:
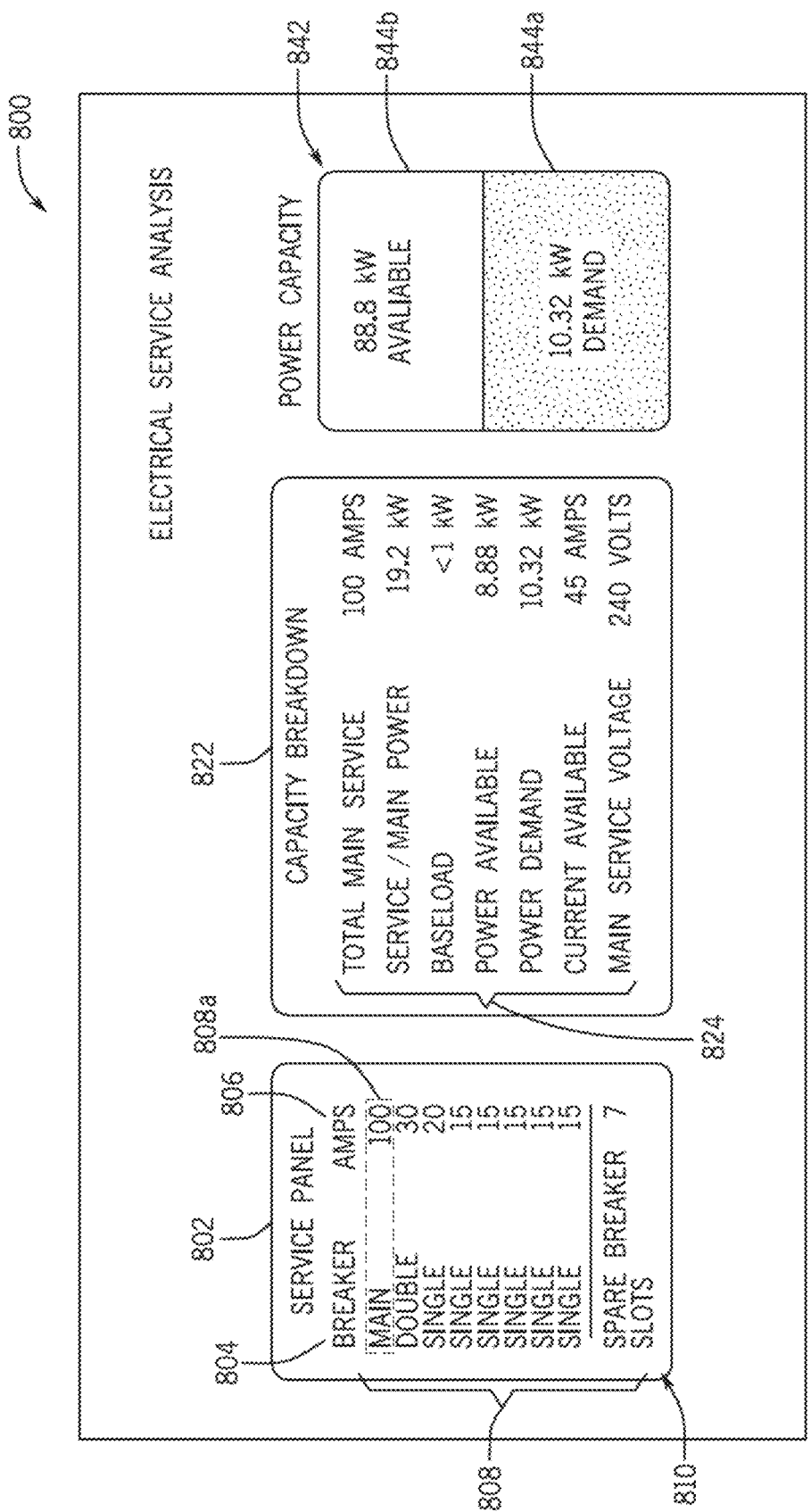
FIG. 8 depicts an example user interface associated with an electrical panel capacity report.

For purposes of illustration, a sample report 800 is shown in FIG. 8. The report 800 may be a user interface displayed on an electronic device, such as a portable computer, including a smart phone, tablet, laptop, and/or other device. The report 800 may generally indicate results or outputs of the electrical panel analysis as described herein, including available breaker slots, an overall electrical power capacity of the electrical panel, an electrical load of the panel, and suitability of the electrical panel for additional secondary circuits, such as circuits associated with a charging station. In this regard, while FIG. 8 shows example results or outputs of the electrical panel analysis, this is for purposes of illustration, and in other cases, the report 800 may include different information.

In FIG. 8, the example report 800 includes a panel component section 802, a panel analysis section 822, and a power capacity section 842. The panel component section 802 may include information associated with a type of electrical component or equipment that is installed in a given electrical panel of interest. For example, and as shown in FIG. 8, the panel component section 802 is shown as including a breaker listing 804 and an associated amperage listing 806. The breaker listing 804 may include a listing of each electrical component of the given electrical panel, e.g., a listing of each breaker, and an indication of the type of breaker, such as a main breaker, a double breaker, a single breaker, and/or other characteristic. The amperage listing 806 may include numerical values corresponding to the amperage for each breaker listed in the breaker listing 804. For purposes of illustration, the panel component section 802 is shown as including data 808 that populates the breaker listing 804 and the amperage listing 806 in the present example. The data 808 may be data or results or other outputs from one or more operations of the panel evaluation and analysis systems and techniques described herein. For example, the data 808 may include a listing of electrical components and associate amperage values based on the deep-learning and image recognition techniques described herein. For example, the data 808 shows a first data row 808*a* listing a "main" value in the breaker listing 804 and a "100" value in the amperage listing 806. The "main" and "100" values may be the result of the image recognition techniques determining that a portion of an image corresponds to a main breaker and that the main breaker has text indicating 100 that is or otherwise corresponds to an amperage of the main breaker. The panel component section 802 may also include a spare slot output 810 which may be indicative of a number of space breaker slots in the given electrical panel. A technician may view the panel component section 802 in order to determine a configuration of the electrical components of the panel.

The report 800 is further shown with the panel analysis section 822. The panel analysis section 822 may include information associated with one or more calculations of the electrical panel, based in part, on the image recognition techniques described herein. For example, using image recognition, the amperage or other characteristic of the electrical panel components may be determined. The characteristics may be used, optionally in conjunction with other information, to calculate various capacity metrics 824, such as a total main service, a service/main power, a baseload, a power available, a power demand, a current available, and a main service voltage, among other characteristics.

The report 800 is further shown with a power capacity section 842. The power capacity section 842 may generally provide a visual indication of the available power capacity for an electrical panel of interest. For example, based on the various capacity metrics 824, a power demand 844*a* and a power available 844*b* may be determined. In some cases, as shown in FIG. 8, this power demand 844*a* and the power available 844*b* may be represented by a graph. In this regard, a technician may determine the available capacity of the electrical panel may viewing the graph. A technician may further make a determination regarding the suitability of the electrical panel for one or more electric vehicle charging stations by comparing the available capacity to the additional load of the charging stations, as well as with reference to the spare slot output 810.

Figure 9:
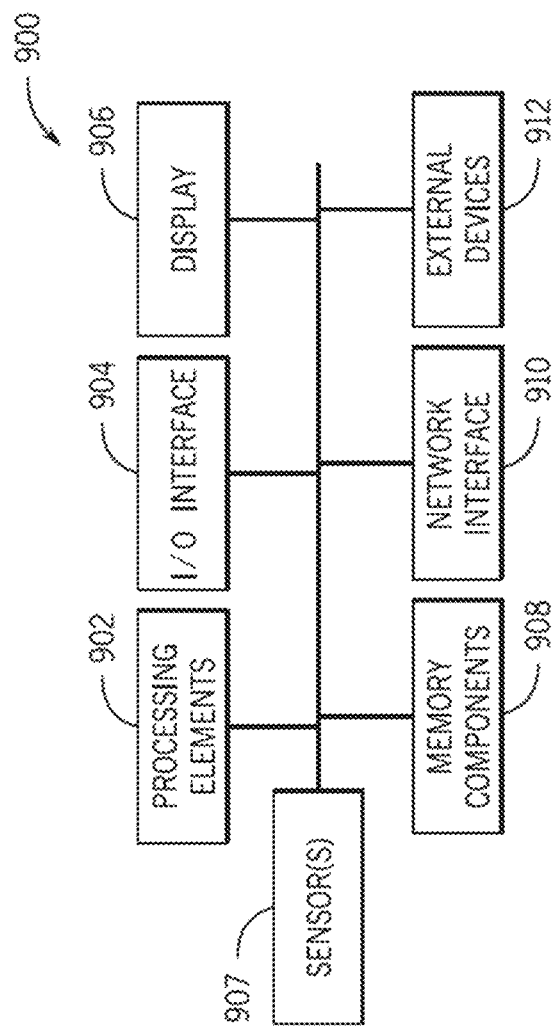
FIG. 9 depicts an example schematic diagram of a computer system for implementing various techniques in the examples described herein.

FIG. 9 depicts an example schematic diagram of a computer system 900 for implementing various techniques in the examples described herein. A computer system 900 may be used to implement the panel analysis module 200 (in FIG. 2), the representation 350 (in FIG. 3B), and/or execute the methods 600 or 700 (in FIGS. 6 and 7, respectively). More generally, the computer system 900 is used to implement or execute one or more of the components or operations disclosed in FIGS. 1-8. In FIG. 9, the computer system 900 may include one or more processing elements 902, an input/output interface 904, a display 906, sensor(s) 907, one or more memory components 908, a network interface 910, and one or more external devices 912. Each of the various components may be in communication with one another through one or more buses, communication networks, such as wired or wireless networks.

The processing element 902 may be any type of electronic device capable of processing, receiving, and/or transmitting instructions. For example, the processing element 902 may be a central processing unit, microprocessor, processor, or microcontroller. Additionally, it should be noted that some components of the computer 900 may be controlled by a first processor and other components may be controlled by a second processor, where the first and second processors may or may not be in communication with each other.

The memory components 908 are used by the computer 900 to store instructions for the processing element 902, as well as store data, such as data associated with an electrical panel (FIG. 2) and the like. The memory components 908 may be, for example, magneto-optical storage, read-only memory, random access memory, erasable programmable memory, flash memory, or a combination of one or more types of memory components.

The display 906 provides visual feedback to a user. Optionally, the display 906 may act as an input element to enable a user to control, manipulate, and calibrate various components of the route-based precondition system 140 or vehicle 120. The display 906 may be a liquid crystal display, plasma display, organic light-emitting diode display, and/or other suitable display. In embodiments where the display 906 is used as an input, the display may include one or more touch or input sensors, such as capacitive touch sensors, a resistive grid, or the like.

The I/O interface 904 allows a user to enter data into the computer 900, as well as provides an input/output for the computer 900 to communicate with other devices or services. The I/O interface 904 can include one or more input buttons, touch pads, and so on. The I/O interface 904 may be an interface of a portable electrical device, such as a smart phone. In some cases, the I/O interface 904 may be a keyboard, accessory, or other components that is associated or associateable with a computing device and capable of receiving a user input.

The computer 900 may also include one or more sensors 907 that may be used to detect a touch and/or force input, environmental condition, orientation, position, or some other aspect of the computer 900. In this regard, the sensors 907 may be used to detect an input at a touch-sensitive display (e.g., display 906) and/or other surface or feature, such as an external surface of the computer device 900 defined by an outer enclosure or shell. Example sensors 907 include, without limitation, one or more accelerometers, gyrometers, inclinometers, goniometers, or magnetometers. The sensors 907 may also include one or more proximity sensors, such as a magnetic hall-effect sensor, inductive sensor, capacitive sensor, continuity sensor, or the like. Resistive and contact-based sensors may also be used.

The one or more sensors 907 may also include a camera that is configured to capture a digital image or other optical data, such as an image of a panel and optical data associated with characteristics of the panel (e.g., switches, breakers, and so on). The camera may include a charge-coupled device, complementary metal oxide (CMOS) device, or other device configured to convert light into electrical signals. The camera may also include one or more light sources, such as a strobe, flash, or other light-emitting device. The camera may be generally categorized as a sensor for detecting optical conditions and/or objects in the proximity of the computing device 900. The camera may also be used to create photorealistic images that may be stored in an electronic format, such as JPG, GIF, TIFF, PNG, raw image file, or other similar file types. The camera may be integrated with the electronic device 900, such as where the camera is an onboard camera of a smart phone or other portable electronic device.

The network interface 910 provides communication to and from the computer 900 to other devices. The network interface 910 includes one or more communication protocols, such as, but not limited to WiFi, Ethernet, Bluetooth, and so on. The network interface 910 may also include one or more hardwired components, such as a Universal Serial Bus (USB) cable, or the like. The configuration of the network interface 910 depends on the types of communication desired and may be modified to communicate via WiFi, Bluetooth, and so on. The external devices 912 are one or more devices that can be used to provide various inputs to the computing device 900, e.g., mouse, microphone, keyboard, trackpad, or the like.

The external devices 912 may be local or remote and may vary as desired. In some examples, the external devices 912 may also include one or more additional sensors.

The foregoing description has a broad application. For example, while examples disclosed herein may focus on central communication system, it should be appreciated that the concepts disclosed herein may equally apply to other systems, such as a distributed, central or decentralized system, or a cloud system. For example, some components may reside on a server in a client/server system, on a user mobile device, or on any device on the network and operate in a decentralized manner. One or more components of the systems may also reside in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of determining a functionality of an electrical panel, the method comprising:
providing information relative to an electrical panel to a computer vision software, wherein the information comprises a digital image of a set of circuit breaker slots of the electrical panel;
analyzing, using the computer vision software, attributes of the electrical panel at least partially based on the information, the attributes comprising an indication of empty circuit breaker slots of the set of circuit breaker slots and one or more symbols identifiable by the computer vision software;
calculating an overall electrical power capacity of the electrical panel based at least in part on the attributes of the electrical panel;
calculating an electrical load on the electrical panel based at least in part on the attributes of the electrical panel; and
generating a report comprising an unused electrical power capacity of the electrical panel at least partially based on the electrical load and the overall electrical power capacity of the electrical panel.

2. The method of claim 1, wherein analyzing the attributes of the electrical panel comprises:
identifying characteristics of each electrical breaker electrically coupled to the electrical panel based on the one or more symbols, the characteristics of the electrical breaker comprising at least one of a voltage rating, an amperage rating, a single pole configuration, a double pole configuration, and a tandem breaker configuration.

3. The method of claim 1, wherein analyzing the attributes of the electrical panel at least partially based on the information comprises at least one of:
identifying, using the computer vision software, operational characteristics of each circuit breaker based at least in part on the one or more symbols corresponding to each circuit breaker;
identifying, using the computer vision software, an amount of vacant breaker slots on the electrical panel;
identifying, using the computer vision software, a make and model of the electrical panel; and
identifying a geographic location at which the digital image was taken.

4. The method of claim 1, wherein calculating the electrical load on the electrical panel comprises estimating an average electrical power provided by the electrical panel to loads connected to the electrical panel.

5. The method of claim 1, wherein calculating the overall electrical power capacity of the electrical panel is at least partially based on operational characteristics of each circuit breaker and a number of vacant electrical breaker slots within the electrical panel.

6. The method of claim 1, wherein calculating the unused electrical power capacity comprises:
comparing the electrical load on the electrical panel to the overall electrical power capacity of the electrical panel.

7. The method of claim 1, wherein calculating the electrical load on the electrical panel comprises estimating an average electrical power provided by the electrical panel at least partially based on historical electrical power provided to the electrical panel.

8. The method of claim 1, further comprising:
transmitting, automatically, the report to at least one of: an owner of the electrical panel, an energy management provider, a municipality, or a supplier of electric vehicle charging equipment.

9. The method of claim 1, further comprising:
training the computer vision software to identify a type of an electrical panel or a type of an electrical breaker.

10. A computing device for determining a functionality of an electrical panel, the computing device comprising:
a processor;
memory in electronic communication with the processor, wherein the memory stores computer executable instructions that, when executed by the processor, cause the processor to perform the steps of:
providing a digital image of an electrical panel to an image recognition module;
identifying, using the image recognition module, one or more symbols representing an amperage rating of each electrical breaker of a plurality of electrical breakers disposed within the electrical panel;
determining, using the image recognition module, an indication of empty circuit breaker slots of a set of circuit breaker slots of the electrical panel;
calculating a maximum electrical capacity of the entire electrical panel based at least in part on the amperage rating of each electrical breaker and the indication of empty circuit breaker slots; and
generating a report comprising the functionality of the electrical panel at least partially based on the maximum electrical capacity of the entire electrical panel.

11. The computing device of claim 10, wherein calculating the maximum electrical capacity of the electrical panel comprises:
determining a weighted amperage rating for each electrical breaker;
estimating an average power provided by each electrical breaker;
summing the average power provided by each electrical breaker to estimate a total average power provided by the electrical panel; and
comparing the total average power to a maximum power output value of the electrical panel, the maximum power output value being at least partially based on one or more vacant electrical breaker slots within the electrical panel.

12. The computing device of claim 11, wherein the memory stores computer executable instructions that, when executed by the processor, cause the processor to further perform the step of:
comparing the estimated total average power to historical power usage data of the electrical panel.

13. The computing device of claim 10, wherein the memory stores computer executable instructions that, when executed by the processor, cause the processor to further perform the step of:
identifying, using the image recognition module, a date the electrical panel was manufactured;
identifying, using the image recognition module, a manufacturer of the electrical panel;
identifying, using the image recognition module, a model of the electrical panel;
identifying a construction date of a building to which the electrical panel provides power; and
identifying a type of building in which the electrical panel is disposed.

14. The computing device of claim 13, wherein the processor is configured to rotate a portion of the digital image depicting the electrical breaker prior to identifying the one or more symbols.

15. A non-transitory computer-readable storage medium storing computer executable instructions that, when executed by a processor, cause the processor to perform the steps of:
- providing information relative to an electrical panel to an image recognition software;
- analyzing, using the image recognition software, attributes of a set of circuit breaker slots of the electrical panel at least partially based on the information, the attributes comprising at least one empty circuit breaker slot and one or more symbols identifiable by the image recognition software;
- calculating a maximum electrical capacity of the electrical panel based at least in part on the attributes of the set of circuit breaker slots of the electrical panel; and
- generating a report comprising a maximum capability of the electrical panel at least partially based on the maximum electrical capacity of the electrical panel;
- wherein the information provided relative to the electrical panel comprises a digital image of the electrical panel, the digital image depicting the set of circuit breaker slots.

16. The non-transitory computer-readable storage medium of claim 15, wherein analyzing the attributes of the electrical panel comprises:
- identifying characteristics of each electrical breaker electrically coupled to the electrical panel based on the one or more symbols, the characteristics of each electrical breaker comprising at least one of a voltage rating, an amperage rating, a single pole configuration, and a double pole configuration.

17. The non-transitory computer-readable storage medium of claim 15, wherein the image recognition software comprises a deep learning convolutional neural network model.

18. The non-transitory computer-readable storage medium of claim 15, wherein calculating the maximum electrical capacity of the electrical panel comprises:
- determining a maximum electrical power output of the electrical panel based at least in part on the attributes of the electrical panel;
- estimating an average electrical power output of the electrical panel based at least in part on the attributes of the electrical panel;
- comparing the maximum electrical power output to the average electrical power output to determine the maximum electrical capacity.

19. The non-transitory computer-readable storage medium of claim 18, wherein estimating the average electrical power output of the electrical panel is further based on an estimated seasonal load of an electrical breaker electrically coupled to the electrical panel.

20. The non-transitory computer-readable storage medium of claim 15, wherein the report comprises a recommendation for modifying the electrical panel to increase the maximum electrical capacity.

* * * * *